(12) United States Patent
Zhou

(10) Patent No.: US 8,577,193 B2
(45) Date of Patent: Nov. 5, 2013

(54) GRATING ASSISTED SURFACE EMITTER LASER COUPLING FOR HEAT ASSISTED MAGNETIC RECORDING

(75) Inventor: Lifu Zhou, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 253 days.

(21) Appl. No.: 13/020,033

(22) Filed: Feb. 3, 2011

(65) Prior Publication Data

US 2012/0201491 A1    Aug. 9, 2012

(51) Int. Cl.
*G02B 6/34* (2006.01)

(52) U.S. Cl.
USPC .......................................................... 385/37

(58) Field of Classification Search
None
See application file for complete search history.

(56) References Cited

U.S. PATENT DOCUMENTS

| 5,044,718 | A | * | 9/1991 | Kando | ............................... 385/4 |
|---|---|---|---|---|---|
| 5,070,488 | A | * | 12/1991 | Fukushima et al. | ........ 369/44.12 |
| 5,105,403 | A | * | 4/1992 | Kando et al. | ................ 369/44.12 |
| 5,652,737 | A | * | 7/1997 | Minami et al. | .............. 369/13.32 |
| 6,064,783 | A | | 5/2000 | Congdon et al. | |
| 6,888,874 | B2 | | 5/2005 | Masood et al. | |
| 7,184,386 | B2 | | 2/2007 | Nikolai et al. | |
| 7,313,158 | B2 | | 12/2007 | Evans et al. | |
| 7,457,341 | B2 | | 11/2008 | Peters et al. | |
| 7,612,934 | B2 | | 11/2009 | Bragg et al. | |
| 8,306,087 | B2 | * | 11/2012 | Behfar et al. | ................. 372/50.1 |
| 2002/0186738 | A1 | * | 12/2002 | Ungar | .............................. 372/50 |
| 2007/0058685 | A1 | * | 3/2007 | O'Daniel et al. | ............... 372/32 |
| 2007/0230048 | A1 | * | 10/2007 | Hasegawa | ..................... 360/126 |
| 2010/0290323 | A1 | | 11/2010 | Isogai et al. | |

* cited by examiner

*Primary Examiner* — Sung Pak
(74) *Attorney, Agent, or Firm* — Hollingsworth Davis LLC

(57) ABSTRACT

An apparatus includes a waveguide, a laser diode positioned adjacent to the waveguide and having an active region producing light in a plane substantially parallel to a plane of the waveguide, a first grating positioned to couple light out of the laser diode and to direct the light toward the waveguide, a reflective layer positioned adjacent to a side of the first grating opposite to the waveguide, and a second grating having the same period as the first grating and positioned to couple light into the waveguide. A data storage device that includes the apparatus is also provided.

20 Claims, 3 Drawing Sheets

GRATING ASSISTED SURFACE EMITTER LASER COUPLING FOR HEAT ASSISTED MAGNETIC RECORDING

BACKGROUND

Heat assisted magnetic recording (HAMR) generally refers to the concept of locally heating a recording media to reduce the coercivity of the media so that an applied magnetic writing field can more easily direct the magnetization of the media during the temporary magnetic softening of the media caused by the heat source. The heated area in the storage layer determines the data bit dimension. A tightly confined, high power light spot is used to heat a portion of the recording media to substantially reduce the coercivity of the heated portion. Then the heated portion is subjected to a magnetic field that sets the direction of magnetization of the heated portion. In this manner the coercivity of the media at ambient temperature can be much higher than the coercivity during recording, thereby enabling stability of the recorded bits at much higher storage densities and with much smaller bit cells.

The recording media may be heated using a light beam generated by a laser diode and coupled into the recording head. Because the waveguide structure inside the laser diode is quite different from the guiding structure inside the recording head, challenges exist in establishing an efficient, reliable and low cost design for coupling the output of the laser diode to the recording head.

Similar issues exist in the area of optical communication and information processing, for example with respect to coupling light from a laser diode into a single mode optical fiber or into a channel waveguide in a planar optical circuit. There are two major categories of solutions to the problem: to use a grating or end firing. Canonical linear grating couplers require a collimated incident beam so extra lenses are necessary. The position and direction of the collimating lens need to be controlled precisely as the coupling efficiency is very sensitive to the incident angle. A curved grating can couple light into a planar waveguide from a point source, but the positioning accuracy requirement for the laser diode is not relaxed. Additional problems of regular grating couplers include wavelength sensitivity and tight process tolerance. In the end firing scenario, the lateral alignment accuracy of two waveguides should be a small fraction of the mode width. Since the spot size of a single transverse mode laser diode may be about 1 micrometer wide, positioning the laser diode chip in a large volume structure at sub-micron accuracy is required for high efficiency but difficult to achieve.

It is desirable to launch light into the waveguide with a low cost apparatus, having good alignment tolerances and high light delivery efficiency.

SUMMARY

In a first aspect, the invention provides an apparatus including a waveguide, a laser diode positioned adjacent to the waveguide and having an active region producing light in a plane substantially parallel to the plane of the waveguide, a first grating positioned to couple light out of the laser diode and to direct the light toward the waveguide, a reflective layer positioned adjacent to a side of the first grating opposite to the waveguide, and a second grating having the same period as the first grating and positioned to couple light into the waveguide.

In another aspect, the invention provides an apparatus including a data storage medium; a recording head including a waveguide, a laser diode positioned adjacent to the waveguide and having an active region producing light in a plane substantially parallel to a plane of the waveguide, a first grating positioned to couple light out of the laser diode and to direct the light toward the waveguide, a reflective layer positioned adjacent to a side of the first grating opposite to the waveguide, and a second grating having the same period as the first grating and positioned to couple light into the waveguide; and an arm for positioning the recording head with respect to the data storage medium.

DETAILED DESCRIPTION OF THE INVENTION

In one aspect, this invention provides an apparatus for coupling light from a laser diode into an optical waveguide. The apparatus can be used for light delivery in heat assisted magnetic recording. It can also be used in other applications that require coupling between two waveguides.

Figure 1:
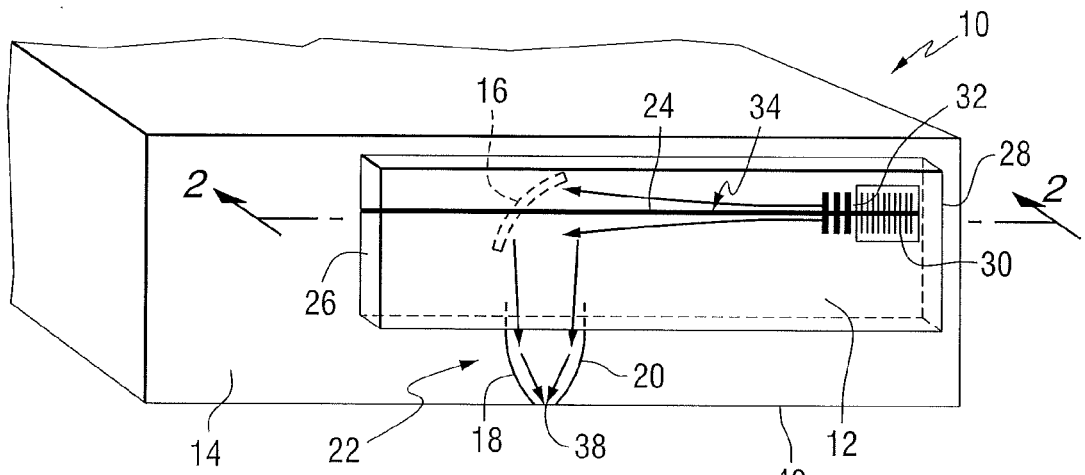
FIG. 1 is a schematic representation of portions of a recording head.

FIG. 1 is a schematic representation of a portion of a recording head 10 that may be used in a heat assisted magnetic storage device, and may include light delivery components in accordance with an embodiment of the invention. A laser diode 12 is shown to be attached to the trailing end 14 of the recording head. The recording head includes a waveguide adjacent to the trailing end. Focusing mirrors as indicated by curved reflector 16 and the edges 18 and 20 of a solid immersion mirror 22 are used to direct light in the waveguide toward a focal point adjacent an air bearing surface of the recording head. The laser diode can be attached to the trailing edge surface of the recording head by solder reflow or epoxy adhesives. Electrical connections to the laser diode can be provided by the solder or through wire bonds.

In this embodiment, an active region 24 of the laser diode is depicted by a line on the bottom of the laser diode. In an alternative embodiment, the active region can be on the top side of the laser diode (i.e., the side opposite the trailing face), provided the laser diode thickness can be made thin enough. The left end 26 of the laser diode in FIG. 1 is cleaved and coated to have high (~100%) reflectivity. The right end 28 of the laser diode is either rough or has anti reflection coating. An output grating 30 is positioned on the bottom of the laser diode. An input coupling grating (not shown in this view) which has the same grating period as the output grating is positioned under the output grating, on the recording head and is used to couple light into the recording head waveguide. Adjacent to the output grating is a relatively short partial reflection grating 32 that has an effective reflectivity of about 70% in a relatively broad wavelength range. The partial reflection grating and the left side surface form the laser cavity 34. The output grating is long enough to guarantee that most of the light propagating towards the right facet 28 is coupled out of the laser diode.

Light that is coupled out of the laser diode is coupled into the waveguide at the trailing end of the recording head. The light passes to the mirror 16 that reflects the light onto the solid immersion mirror 22 that serves as a focusing element. In one example, the focusing element is a parabolic solid immersion mirror that includes sides 18 and 20 that have a parabolic shape and reflect the light toward a focal point 38 adjacent to the air bearing surface 40 of the recording head.

Figure 2:
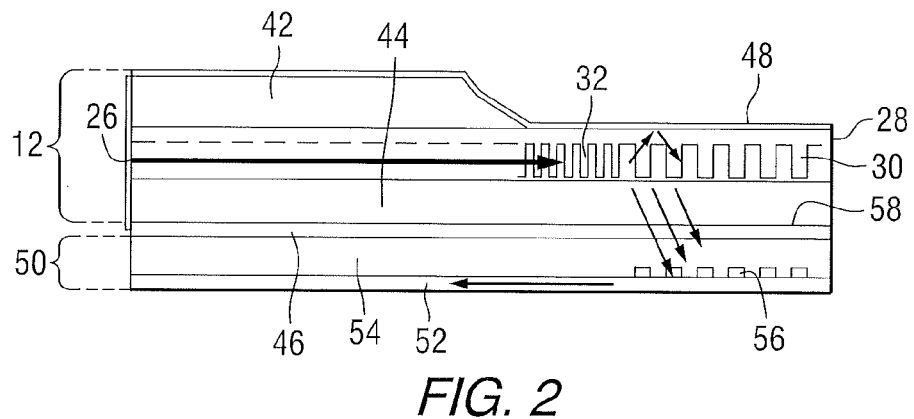
FIG. 2 is a schematic representation of a portion of a light delivery system of the recording head of FIG. 1.

FIG. 2 is a cross-sectional view of the laser diode and a portion of the waveguide in the recording head of FIG. 1 taken along line 2-2. In this embodiment, the laser diode is placed with the P-side 42 up. The N-side 44 of the laser is bonded to the recording head with a thin fusion layer 46. The waveguide in the laser diode is a single transverse mode channel waveguide. Light scattered by the output grating 30 propagates into both up and down directions. A gold mirror 48 on the top reflects the up going beam back in to the grating area. Thus the downward emitting power can be maximized by properly selecting the distance between the top gold mirror and active layer.

Light produced by the laser diode is coupled into a waveguide 50 (also referred to herein as the output waveguide) at the trailing end of the recording head. The waveguide includes a core layer 52 and a cladding layer 54 positioned adjacent to the core layer. A waveguide input grating 56 is used to couple the laser light into the core layer of the waveguide. An anti-reflection layer 58 can be positioned either on the laser diode emitting surface, as shown in FIG. 2, or on the cladding layer 54 of waveguide 50. Light traveling in the core layer 52 is reflected by reflector 16 and directed to the solid immersion mirror 22.

It is known that the wavelength of light produced in the laser diode will change with pumping current and environment temperature. In prior art laser diodes, the wavelength is fixed with a DBR or DFB grating in the laser diode so that the output beam direction doesn't change.

However, it is desirable to allow the wavelength of the laser diode to be able to change freely, so that the laser diode energy efficiency is maximized. By using gratings with the same period, the propagation direction of modes in the laser diode and the output waveguide are antiparallel to each other, and the wavelength change can be compensated. One end of the laser is used for reflection, in contrast to distributed Bragg reflector (DBR) mirrors used in prior art laser diodes. The other end of the laser has anti-reflection coating or rough surface. Otherwise optical feedback would affect the laser operation.

In one example wherein the laser diode substrate has a refractive index of about 3.2 and the cladding layer has a refractive index of about 1.65, there is an anti-reflection layer either on the laser diode emitting surface or the output waveguide cladding layer surface. This anti-reflection layer can be a single layer film with an index of about 2.3 or a multilayer filter. However, the anti reflection layer should be thin enough (e.g., less than about 1 micrometer) so that the beam doesn't diverge in a direction transverse to the active region.

Figure 3:
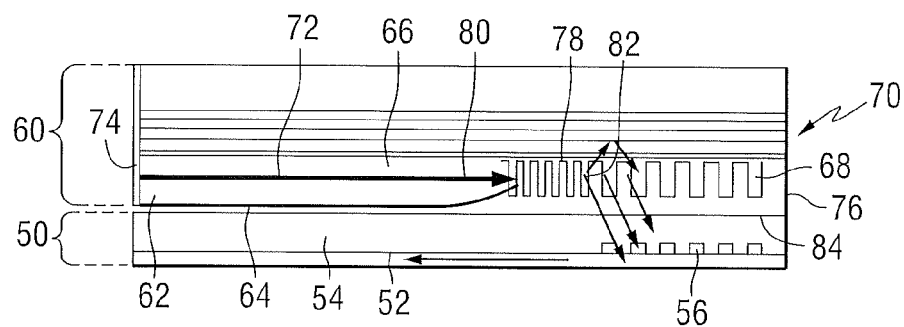
FIG. 3 is a schematic representation of a portion of another light delivery system.

In another embodiment, shown in FIG. 3, the top gold mirror can be replaced by a distributed Bragg reflector (DBR) on the laser diode. In this embodiment, the laser diode 60 is placed with the P-side 62 down to expose the grating area, and is bonded to the recording head with a thin fusion layer 64. The N-side 66 of the laser is on the side opposite to the recording head. Light scattered by the output grating 68 propagates in both up and down directions. A distributed Bragg reflector 70 on the top reflects the up going beam back into the grating area. Thus the downward emitting power can be maximized by properly selecting the distance between the top DBR and the active layer.

Light produced by the laser diode is coupled into the waveguide 60 at the trailing end of the recording head. The waveguide includes a core layer 72 and a cladding layer 74 positioned adjacent to the core layer. A waveguide input grating 76 is used to couple the laser light into the core layer of the waveguide.

In this embodiment, an active region 72 of the laser diode is depicted by a line in the laser diode. The left end 74 of the laser diode in FIG. 3 is cleaved and coated to have high (~100%) reflectivity. The right end 76 of the laser diode is either rough or has an anti reflection coating. The output grating 68 is positioned on the bottom of the laser diode. An input coupling grating 56 which has the same grating period as the output grating is positioned under the output grating, on the recording head and is used to couple light into the recording head waveguide. Adjacent to the output grating is a relatively short partial reflection grating 78 that has an effective reflectivity of about 70% in a relatively broad wavelength range. The partial reflection grating and the left side surface form the laser cavity 80. The output grating is long enough to guarantee that most of the light emitted at the right facet 82 is coupled out of the laser diode. Light that is coupled out of the laser diode is coupled into the waveguide at the trailing end of the recording head. As shown in FIG. 1, that light passes to the mirror 16 that reflects the light onto the solid immersion mirror 22 that serves as a focusing element. An anti-reflection layer 84 can be positioned either on the laser diode emitting surface, or on the cladding layer 54 of waveguide 50, as shown in FIG. 3.

In the examples of FIGS. 2 and 3, to achieve automatic wavelength compensation, the output grating and the input grating should have the same period, and the direction of guided wave in the waveguide should propagate in a direction opposite to that of the light exiting the laser facet. Assuming the effective mode index of the laser output grating area to be $N_1$, the effective mode index of the waveguide input grating on the head to be $N_2$ and the wavelength of interest to be $\lambda_0$, the grating period should be $2\lambda_0/(N_1+N_2)$. A good estimated value of a suitable period is 400 nm for most GaAs/AlGaAs based lasers.

Figure 4:
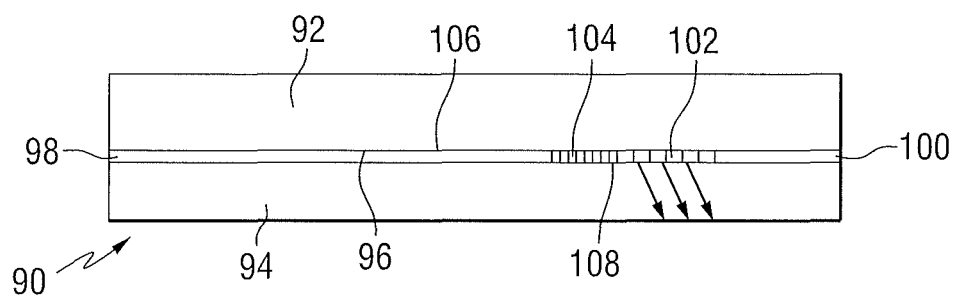
FIG. 4 is a side view of a laser diode.

In another aspect, the invention provides a laser diode. FIG. 4 is a side view of a laser diode structure 90 that includes a p-side layer 92 and an n-side layer 94 on opposite sides of an active region 96. The left end 98 of the laser diode structure is coated with a reflective coating to have high (~100%) reflectivity. The right end 100 of the laser diode structure is either rough or has an anti-reflection coating. An output grating 102 is positioned adjacent to the active region. Adjacent to the output grating is a relatively short partial reflection grating 104 that has an effective reflectivity of about 70% in a relatively broad wavelength range. The partial reflection grating and the left end surface form the laser cavity 106. The output grating is long enough to guarantee that most of the light emitted at the right facet 108 is coupled out of the laser diode, as shown by the arrows.

Figure 5:
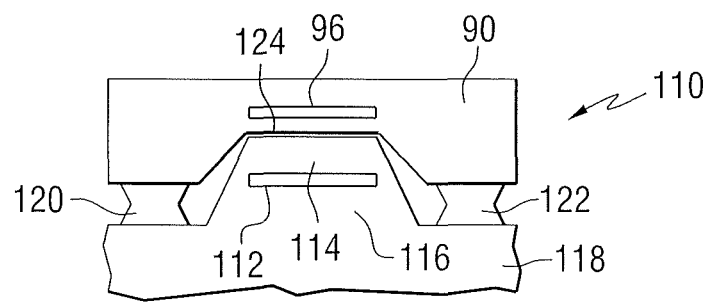
FIG. 5 is a cross-sectional view of a portion of a laser diode and waveguide assembly.

FIG. 5 is a cross-sectional view of a portion of the laser diode of FIG. 4 and a waveguide assembly 110. The waveguide assembly includes a core layer 112, and cladding layers 114 and 116 on opposite sides of the core layer. The waveguide is mounted on a substrate 118. Solder connections 120 and 122 are provided between the laser diode and the substrate. A gap 124 may exist between the laser diode and the waveguide, providing a free space path for the light between the laser diode and the waveguide grating. Thus the light from the laser diode is first coupled into free space then coupled into the output grating. To compensate for changes in the wavelength of the laser diode, the grating period is chosen based on the mode index of the waveguide and the laser diode material. In general, that will cause the beam exiting the output grating to take a relatively large incident angle at the laser diode bottom surface. The laser diode surface with the output grating thus should be placed very close to the cladding layer of the waveguide where the mode is to be launched. A large air gap between the laser diode and the output waveguide grating would cause total internal reflection at the laser diode-air interface. The maximum allowed air gap is about 1/10 of the free space wavelength. This small gap can be achieved using an adhesive or re-flowing solder on both sides of the active region.

For a single mode laser diode, the active region is relatively narrow, so the effective exiting aperture of the output grating is narrow in one dimension, and the output beam will diverge quickly on that dimension. For that reason, the vertical distance between the output grating in the laser diode and the input grating in the recording head should be as small as possible. In one example, the width of the active region is about 3 micrometers. The output beam from the grating coupler on the laser is several tens of micrometers long in the direction parallel to the propagation and about 3 micrometers wide on the other direction (transverse direction). Due to diffraction, the beam will diverge quickly in the transverse direction. The maximum distance from the output grating (in the laser diode) and the input grating is about 5 micrometer. In addition, the thickness of the cladding layer in the input coupler part should be as small as possible. The smallest value of cladding layer thickness for one proposed design is about 0.5 micrometers.

Figure 6:
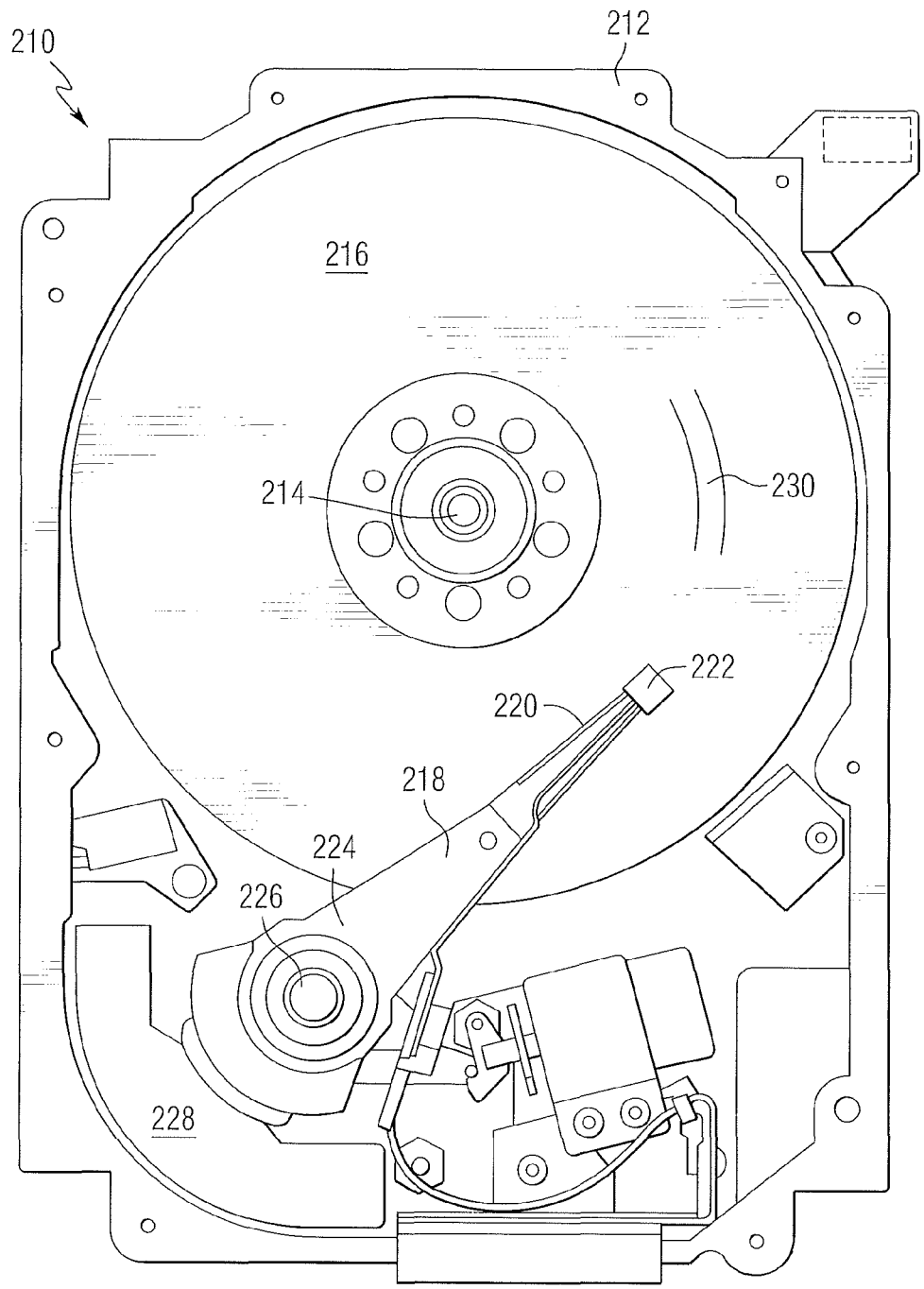
FIG. 6 is a pictorial representation of a data storage device in the form of a disc drive that can include a recording head in accordance with an aspect of this invention.

FIG. 6 is a pictorial representation of a magnetic storage device in the form of a disc drive that can include a recording head constructed in accordance with the invention. The disc drive 210 includes a housing 212 (with the upper portion removed and the lower portion visible in this view) sized and configured to contain the various components of the disc drive. The disc drive 210 includes a spindle motor 214 for rotating at least one storage medium 216, which may be a magnetic recording medium, within the housing 212. At least one arm 218 is contained within the housing 212, with each arm 218 having a first end 220 with a recording head or slider 222, and a second end 224 pivotally mounted on a shaft by a bearing 226. An actuator motor 228 is located at the arm's second end 224 for pivoting the arm 218 to position the recording head 222 over a desired sector or track 230 of the disc 216. The actuator motor 228 is regulated by a controller, which is not shown in this view and is well-known in the art.

For heat assisted magnetic recording (HAMR), an electromagnetic wave of for example, visible, infrared or ultraviolet light is directed onto a surface of a data storage medium to raise the temperature of a localized area of the medium to facilitate switching of the magnetization of the area. The recording head can include a laser and thin film waveguide as shown in FIGS. 1-5 on a slider to guide light to the storage medium for localized heating of the storage medium.

While the invention has been described in terms of several examples, it will be apparent to those skilled in the art that various changes can be made to the described examples without departing from the scope of the invention as set forth in the following claims. The implementations described above and other implementations are within the scope of the following claims.

What is claimed is:

1. An apparatus comprising:
    a waveguide;
    a laser diode positioned adjacent to the waveguide and having an active region producing light in a plane substantially parallel to and above a plane of the waveguide;
    a first grating positioned to couple light out of the laser diode and to direct the light toward the waveguide;
    a reflective layer positioned adjacent to a side of the first grating opposite to the waveguide; and
    a second grating having the same period as the first grating and positioned to couple light into the waveguide.

2. The apparatus of claim 1, wherein the plane of the active region of the laser diode and the plane of the waveguide are separated by a gap that is less than about one-tenth of the free space wavelength of the light.

3. The apparatus of claim 1, wherein the laser diode forms a single mode channel waveguide.

4. The apparatus of claim 1, further comprising:
    an anti-reflective coating on at least one of an output surface of the laser diode, or a surface of a cladding layer of the waveguide.

5. The apparatus of claim 1, further comprising:
    an anti-reflective coating on one end of the laser diode.

6. The apparatus of claim 1, further comprising:
    a rough surface on one end of the laser diode.

7. An apparatus comprising:
    a waveguide;
    a laser diode positioned adjacent to the waveguide and having an active region producing light in a plane substantially parallel to a plane of the waveguide;
    a first grating positioned to couple light out of the laser diode and to direct the light toward the waveguide;
    a reflective layer positioned adjacent to a side of the first grating opposite to the waveguide, wherein the first grating is positioned between the reflective layer and a substrate; and
    a second grating having the same period as the first grating and positioned to couple light into the waveguide.

8. The apparatus of claim 1, wherein the reflective layer comprises a distributed Bragg reflector.

9. The apparatus of claim 1, further comprising:
    a partially reflecting grating and a reflective surface positioned at opposite ends of a cavity in the laser diode.

10. An apparatus comprising:
    a data storage medium;
    a recording head including
    a waveguide,
    a laser diode positioned adjacent to the waveguide and having an active region producing light in a plane substantially parallel to a plane of the waveguide, wherein the plane of the active region of the laser diode and the plane of the waveguide are separated from one another,
    a first grating positioned to couple light out of the laser diode and to direct the light toward the waveguide,
    a reflective layer positioned adjacent to a side of the first grating opposite to the waveguide, and
    a second grating having the same period as the first waveguide and positioned to couple light into the waveguide; and an arm for positioning the recording head with respect to the data storage medium.

11. The apparatus of claim 10, wherein the plane of the active region of the laser diode and the plane of the waveguide are separated by a gap that is less than about one-tenth of the free space wavelength of the light.

12. The apparatus of claim 10, wherein the laser diode forms a single mode channel waveguide.

13. The apparatus of claim 10, further comprising:
an anti-reflective coating on at least one of an output surface of the laser diode, or a surface of a cladding layer of the waveguide.

14. The apparatus of claim 10, further comprising:
an anti-reflective coating on one end of the laser diode.

15. The apparatus of claim 10, further comprising:
a rough surface on one end of the laser diode.

16. The apparatus of claim 10, wherein the first grating is positioned between the reflective layer and a substrate.

17. The apparatus of claim 10, wherein the reflective layer comprises a distributed Bragg reflector.

18. The apparatus of claim 10, further comprising:
a partially reflecting grating and a reflective surface positioned at opposite ends of a cavity in the laser diode.

19. An apparatus comprising:
a structure including a p-side layer and an n-side layer on opposite sides of an active region;
a reflective coating on a first end of the structure;
a rough surface or an anti-reflection coating on a second end of the structure, wherein the first end of the structure is opposite the second end of the structure;
an output grating positioned adjacent to the active region; and
a partial reflection grating adjacent to the output grating.

20. The apparatus of claim 19, wherein the partial reflection grating and the first end of the structure form a laser cavity.

* * * * *